United States Patent
Bonigen et al.

(10) Patent No.: US 10,618,640 B2
(45) Date of Patent: Apr. 14, 2020

(54) AIRCRAFT BRAKING SYSTEM HAVING A HIGH LEVEL OF AVAILABILITY

(71) Applicant: SAFRAN LANDING SYSTEMS, Velizy Villacoublay (FR)

(72) Inventors: Francois Bonigen, Velizy-Villacoublay (FR); David Frank, Velizy-Villacoublay (FR); Raphael Pierra, Velizy-Villacoublay (FR); Dominique Onfroy, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 50 days.

(21) Appl. No.: 15/657,709

(22) Filed: Jul. 24, 2017

(65) Prior Publication Data

US 2018/0022446 A1   Jan. 25, 2018

(30) Foreign Application Priority Data

Jul. 25, 2016 (FR) ..................... 16 57134

(51) Int. Cl.
  *B64C 25/44*   (2006.01)
  *B60T 8/17*   (2006.01)
  *B64C 25/34*   (2006.01)

(52) U.S. Cl.
  CPC ............ *B64C 25/44* (2013.01); *B60T 8/1703* (2013.01); *B64C 25/34* (2013.01); *B60T 2270/40* (2013.01)

(58) Field of Classification Search
  CPC ....... B64C 25/44; B64C 25/34; B60T 8/1703; B60T 2270/40
  See application file for complete search history.

(56) References Cited

U.S. PATENT DOCUMENTS

| 4,789,938 A | * | 12/1988 | Maehata | ................. B60T 8/885 303/122.05 |
| 8,948,994 B2 |  | 2/2015 | Frank |  |

(Continued)

FOREIGN PATENT DOCUMENTS

| EP | 2 338 748 A1 | 6/2011 |
| EP | 2 878 501 A1 | 6/2015 |
| EP | 2 878 503 A1 | 6/2015 |

OTHER PUBLICATIONS

French Written Opinion issued in FR 1657134 dated May 8, 2017.
French Search Report issued in FR 1657134 dated May 8, 2017.

*Primary Examiner* — Nadeem Odeh
*Assistant Examiner* — Michael V Kerrigan
(74) *Attorney, Agent, or Firm* — Sughrue Mion, PLLC

(57) ABSTRACT

An aircraft braking system comprising: a first group (Ga) of actuators and a second group (Gb) of actuators. A first control module (105a) is adapted, in a nominal mode, to control the first group, and in a reconfigured mode, to control the first group and the second group. A second control module (105b) is adapted, in a nominal mode, to control the second group, and in a reconfigured mode, to control the first group and the second group. A monitoring unit adapted is adapted to monitor the first control module and the second control module, and to put the first control module into the reconfigured mode of operation when the monitoring unit detects a failure of the second control module, and to put the second control module into the reconfigured mode when the monitoring unit detects a failure of the first control module.

9 Claims, 6 Drawing Sheets

(56) References Cited

U.S. PATENT DOCUMENTS

| | | |
|---|---|---|
| 2001/0045771 A1 | 11/2001 | Corio et al. |
| 2008/0258547 A1* | 10/2008 | Ralea ............... B60T 8/1703 |
| | | 303/122 |
| 2008/0258548 A1 | 10/2008 | May et al. |
| 2011/0155521 A1 | 6/2011 | Thibault et al. |

* cited by examiner

| Discrete hardware input | Discrete software input | Mode of operation |
|---|---|---|
| 0 | X | Deactivation |
| 1 | 0 | Nominal |
| 1 | 1 | Reconfigured |

…

AIRCRAFT BRAKING SYSTEM HAVING A HIGH LEVEL OF AVAILABILITY

The invention relates to the field of aircraft braking systems.

BACKGROUND OF THE INVENTION

Conventional electric braking systems for aircraft are designed on the basis of architectures that are said to be "simple" or on architectures that are to be said "dissimilar".

A "simple" architecture, corresponding to a portion of a braking system, is shown in FIG. 1. The portion of the braking system comprises a braking computer 1 and four electromechanical actuators 2, each comprising an electric motor. The electromechanical actuators 2 are designed to produce a pressing force in order to brake wheels of an aircraft.

The braking computer 1 comprises a braking control module 3, four motor control modules 4, and four inverters 5. The braking control module 3 executes software that performs a slow servo-control loop. Each motor control module 4 executes software that performs a fast servo-control loop. The braking control module 3 transmits a control setpoint to each motor control module 4. Each motor control module 4 controls the motor of one of the electromechanical actuators 2 via one of the inverters 5. This simple architecture is referred to herein as "centralized", and would be said to be "distributed" only if each inverter 5 were remote, and positioned in the proximity of, or on, the electromechanical actuator 2 for which it participates in providing control.

A "dissimilar" architecture, corresponding to a portion of a braking system, is shown in FIG. 2. The braking computer 10 has two braking control modules 11, four motor control modules 12, and four inverters 13. The two braking control modules 11 are of designs that are mutually different in terms of hardware and/or software. Each braking control module 11 transmits a control setpoint to two motor control modules 12 in order to control the motors of two electromechanical actuators 14. This dissimilar architecture is referred to herein as "centralized", and would be said to be "distributed" only if each inverter 13 were remote, and positioned in the proximity of, or on, the electromechanical actuator 14 for which it participates in providing control.

With a "simple" architecture, a common mode failure can lead to total loss of braking. With a "dissimilar" architecture, a common mode failure can lead to loss of no more than 50% of the braking (in the event of a failure in one of the braking control modules).

Nevertheless, it should be observed in order to improve the availability of commercial aircraft, that it is often required for braking performance to be guaranteed when one of the electromechanical actuators has failed (simple failure) and is no longer capable of producing a braking force. In such a situation, a common mode failure can lead to the loss of 75% of the braking with an architecture that is dissimilar: for a brake having four electromechanical actuators, only one electromechanical actuator remains controllable. With an architecture that is simple, such an event can lead to total loss of braking.

Object of the Invention

An object of the invention is to improve the availability of an aircraft.

SUMMARY OF THE INVENTION

For this purpose, the invention provides an aircraft braking system comprising:
a first group of electromechanical actuators and a second group of electromechanical actuators arranged to apply a braking force to one or more wheels of the aircraft;
a first control module adapted, in a nominal mode of operation, to control the first group of electromechanical actuators, and in a reconfigured mode of operation, to control the first group of electromechanical actuators and the second group of electromechanical actuators, and a second control module adapted, in a nominal mode of operation, to control the second group of electromechanical actuators, and in a reconfigured mode of operation, to control the first group of electromechanical actuators and the second group of electromechanical actuators; and
a monitoring unit adapted to monitor the operation of the first control module and of the second control module, and to put the first control module into the reconfigured mode of operation when the monitoring unit detects a failure of the second control module, and to put the second control module into the reconfigured mode of operation when the monitoring unit detects a failure of the first control module.

The reconfigured mode of operation of the control modules enables the braking system of the invention to control a larger number of electromechanical actuators in the event of a failure of one of the control modules.

This improves the possibilities of reconfiguring the braking system of the invention and, in the event of a simple failure and/or a common mode failure, it is possible to maintain braking performance at an acceptable level.

The invention makes it possible to improve the availability of an aircraft by adding components that are simple, and without adding hardware redundancy.

There is also provided a braking system as described above, wherein when one of the first and second control modules is in the reconfigured mode of operation, the other one of the first and second control modules is necessarily inhibited, and wherein, when one of the first and second control modules is in the nominal mode of operation, the other one of the first and second control modules is likewise necessarily in the nominal mode of operation.

There is also provided a braking system as described above, wherein the monitoring unit includes a first monitoring module arranged to monitor the operation of the first control module and a second monitoring module arranged to monitor the operation of the second control module, the first monitoring module being adapted, on detecting a failure of the first control module, to cause the second control module to switch into the reconfigured mode, and the second monitoring module being adapted, on detecting a failure of the second control module, to cause the first control module to switch into the reconfigured mode.

There is also provided a braking system as described above, wherein each of the first and second monitoring modules has an output connected both to a discrete input of the first control module and to a discrete input of the second control module, the discrete outputs and inputs being used to cause the first and second control modules to switch into the nominal mode of operation and into the reconfigured mode of operation.

There is also provided a braking system as described above, wherein each monitoring module possesses a plurality of inputs receiving monitoring signals and performs a recombination function on the plurality of inputs, the result of the recombination function being applied to the output of the monitoring module.

There is also provided a braking system as described above, wherein the monitoring signals comprise a software monitoring signal serving to detect an absence of braking in response to a braking setpoint and/or a hardware monitoring signal serving to detect a lack of activity and/or a signal monitoring the output from a control module.

There is further provided a braking system as described above, wherein each control module possesses a nominal output used in the nominal mode of operation and in the reconfigured mode of operation, and a reconfigured output used solely in the reconfigured mode of operation, the nominal output of one of the control modules and the reconfigured output of the other control module being connected to electromechanical actuators via an OR unit that performs a logic OR function on inputs of the OR unit and that applies the result of the OR function to an output of the OR unit.

There is also provided a braking system as described above, wherein each electromechanical actuator is controlled via an inverter incorporated in a braking computer in which the first and second control modules are positioned.

There is also provided a braking system as described above, wherein each electromechanical actuator is controlled via an inverter incorporated in the electromechanical actuator.

Other characteristics and advantages of the invention appear on reading the following description of particular non-limiting embodiments of the invention.

BRIEF DESCRIPTION OF THE DRAWINGS

Reference is made to the accompanying drawings, in which.

DETAILED DESCRIPTION OF THE INVENTION

The aircraft braking system in a first embodiment of the invention has eight electromechanical actuators for producing braking forces to brake two wheels of an aircraft, and two braking computers that control the eight electromechanical actuators.

Figure 1:
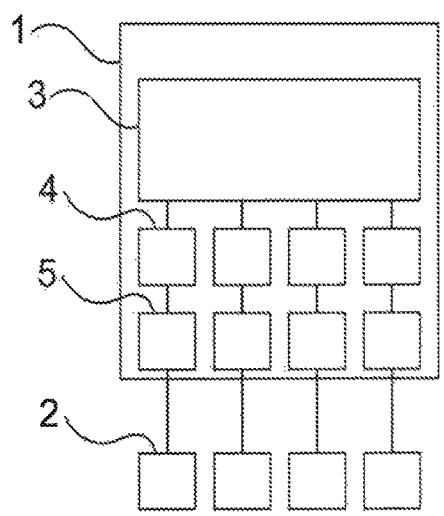
FIG. 1 shows a prior art aircraft braking system arranged with a simple centralized architecture.
Figure 2:
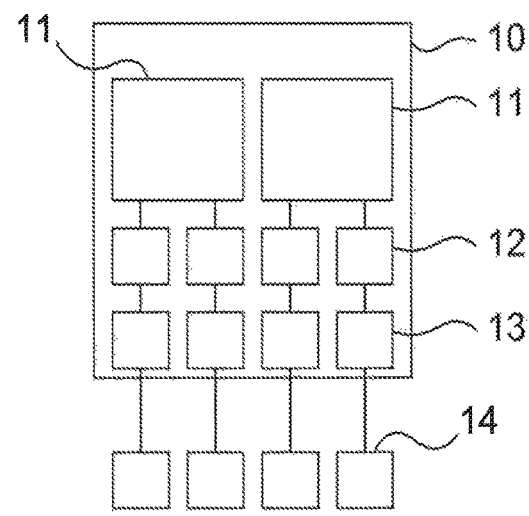
FIG. 2 shows a prior art aircraft braking system arranged with a dissimilar centralized architecture.
Figure 3:
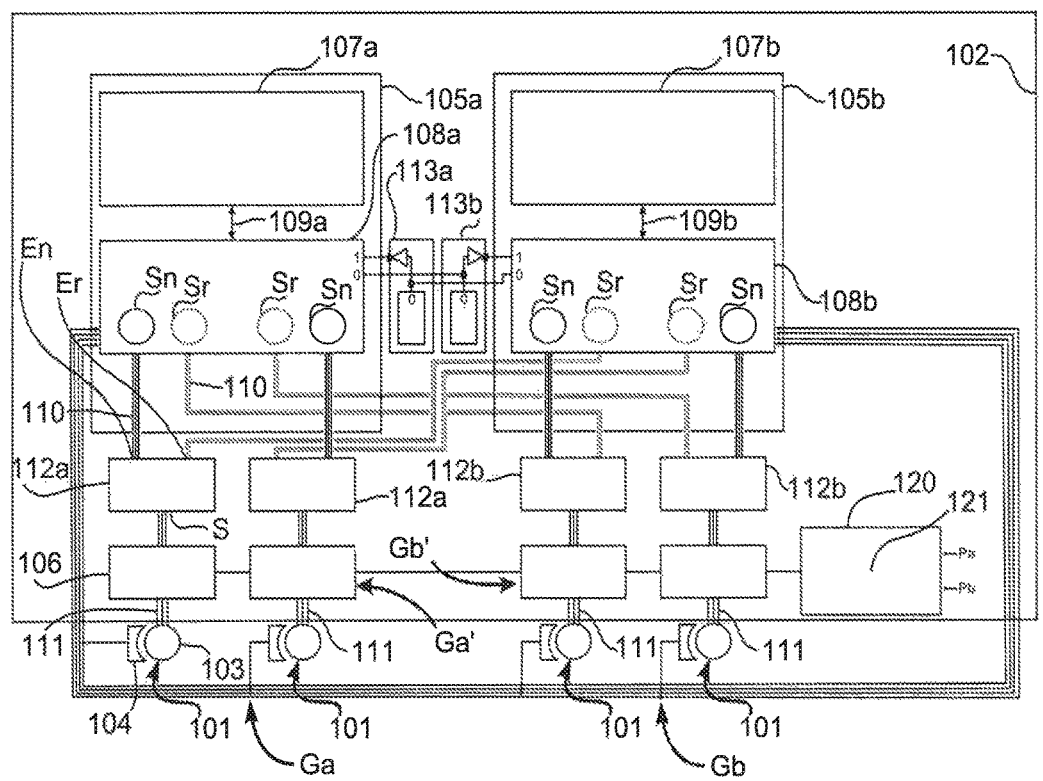
FIG. 3 shows an aircraft braking system in a first embodiment of the invention, the braking system being configured to operate in a nominal mode.

With reference to FIG. 3, there is shown the aircraft braking system in a first embodiment of the invention making use of only four electromechanical actuators 101 and a braking computer 102 that controls the four electromechanical actuators 101.

The four electromechanical actuators 101 and the braking computer 102 thus need to be duplicated in order to obtain the complete aircraft braking system.

The four electromechanical actuators 101 are distributed in a first group Ga of electromechanical actuators 101 and in a second group Gb of electromechanical actuators 101. Each of the first and second groups Ga and Gb includes an electromechanical actuator 101 that produces one-fourth of the total braking force for braking one wheel and an electromechanical actuator 101 that produces one-fourth of the total braking force for braking the other wheel (for each wheel, the remaining half of the total braking force is delivered by the above-mentioned duplication).

Each electromechanical actuator 101 has a motor 103, an angular position sensor 104 for sensing the angular position of a rotor of the motor 103, and a pusher driven by the motor 103 in order to apply the braking force against friction members so as to brake the wheel.

The braking computer 102 has a first control module 105a, a second control module 105b, and four inverters 106 that are distributed as a first group Ga' of inverters 106 and a second group Gb' of inverters 106 (the first group Ga' and the second group Gb' each having two inverters 106).

The architecture of the braking system in the first embodiment is said to be centralized, since the inverters 106 are grouped together in the braking computer 102 and they are not remote so as to be in the proximity of the electromechanical actuators 101.

The first control module 105a includes a first braking control module 107a and a first motor control module 108a connected together by a first digital bus 109a that provides both-way communication. The second control module 105b includes a second braking control module 107b and a second motor control module 108b that are connected together by a second digital bus 109b that provides both-way communication.

The first braking control module 107a and the second braking control module 107b are designed differently from each other at the hardware level. The first motor control module 108a and the second motor control module 108b are designed differently from each other at the hardware level. The braking system thus presents architecture that is dissimilar.

The first braking control module 107a and the second braking control module 107b receive respective braking setpoints and they execute software implementing a slow braking servo-control loop.

The first braking control module 107a acts via the first digital bus 109a to transmit a control setpoint to the first motor control module 108a. The first motor control module 108a executes software that implements a fast servo-control loop for controlling the motor in order to generate control commands. The second braking control module 107b acts via the second digital bus 109b to transmit a control setpoint to the second motor control module 108b. The second motor control module 108b executes software that implements a fast motor servo-control loop to generate control commands.

The first control module 105a and the second control module 105b are each adapted to control all four electromechanical actuators 101.

The software in the first braking control module 107a, in the second braking control module 107b, in the first motor control module 108a, and in the second motor control module 108b thus has all of the information required for controlling the motors of all four electromechanical actuators 101.

Each of the first and second motor control modules 108a and 108b also has two "nominal" outputs Sn and two "reconfigured" outputs Sr, each enabling the first and second motor control modules 108a and 108b to transmit a control command via a command line 110 (having three conductors) to each inverter 106, both of the first group Ga' of inverters 106 and also of the second group Gb' of inverters 106. The control command is constituted by logic signals.

Each inverter 106 of the first group Ga' transmits control electrical power via a three-phase line 111 (having three conductors) to the motor of one of the electromechanical actuators 101 of the first group Ga of electromechanical actuators 101. Each inverter 106 of the second group Gb' transmits control electrical power via a three-phase line 111 (having three conductors) to the motor 3 of one of the electromechanical actuators 101 of the second group Gb' of electromechanical actuators 101.

The braking computer 102 also has two first OR units 112a and two second OR units 112b. Each of the first OR units 112a and each of the second OR units 112b possess a nominal input En, a reconfigured input Er, and an output S.

Each nominal output Sn of the first motor control module 108a is connected to the nominal input En of one of the two first OR units 112a. Each reconfigured output Sr of the first braking control module 108a is connected to the reconfigured input Er of one of the two second OR units 112b.

Each nominal output Sn of the second motor control module 108b is connected to the nominal input En of one of the two second OR units 112b. Each reconfigured output Sr of the second braking control module 108b is connected to the reconfigured input Er of one of the two first OR units 112a.

Figures 4, 7:
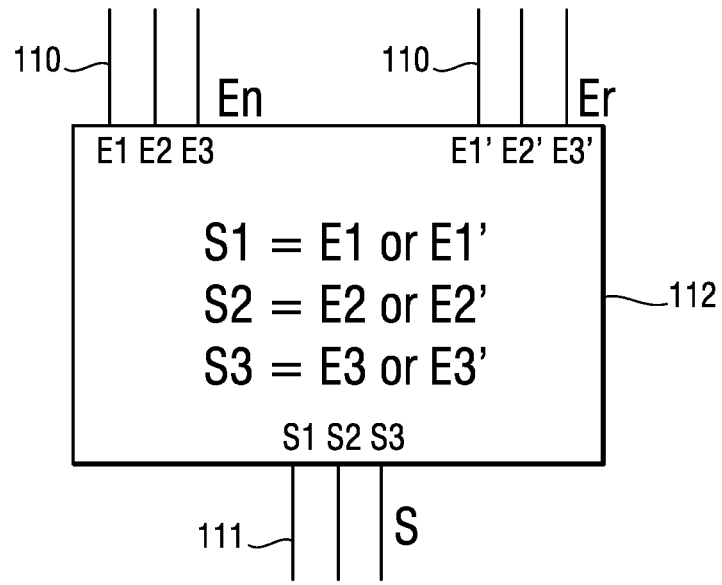
FIG. 4 shows an OR unit of the aircraft braking system in the first embodiment of the invention.
FIG. 7 is a table containing the operating state of a motor control module of the braking system in the first embodiment of the invention.

Thus, with reference to FIG. 4, each OR unit 112 possesses a nominal input En connected to the three conductors of a command line 110 itself connected to a nominal output Sn of one of the motor control modules 108, and a reconfigured input Er connected to the three conductors of a command line 110, itself connected to a reconfigured output Sr of the other motor control module 108.

Each OR unit 112 performs a logic OR function on its nominal input En and its reconfigured input Er, and applies the result on its output S. The logic OR function applies on the command logic signals for controlling the inverters.

Thus, the signals on the three conductors connected to the output S of each OR unit 112 are equal to the signals on the nominal input En or are equal to the signals on the reconfigured input Er, as a function of the results of the logic OR function.

The braking computer 102 also has a monitoring unit adapted to monitor the operation of the first control module 105a and of the second control module 105b.

The monitoring unit has a first monitoring module 113a monitoring the operation of the first control module 105a, and a second monitoring module 113b monitoring the operation of the second control module 105b.

Figure 5:
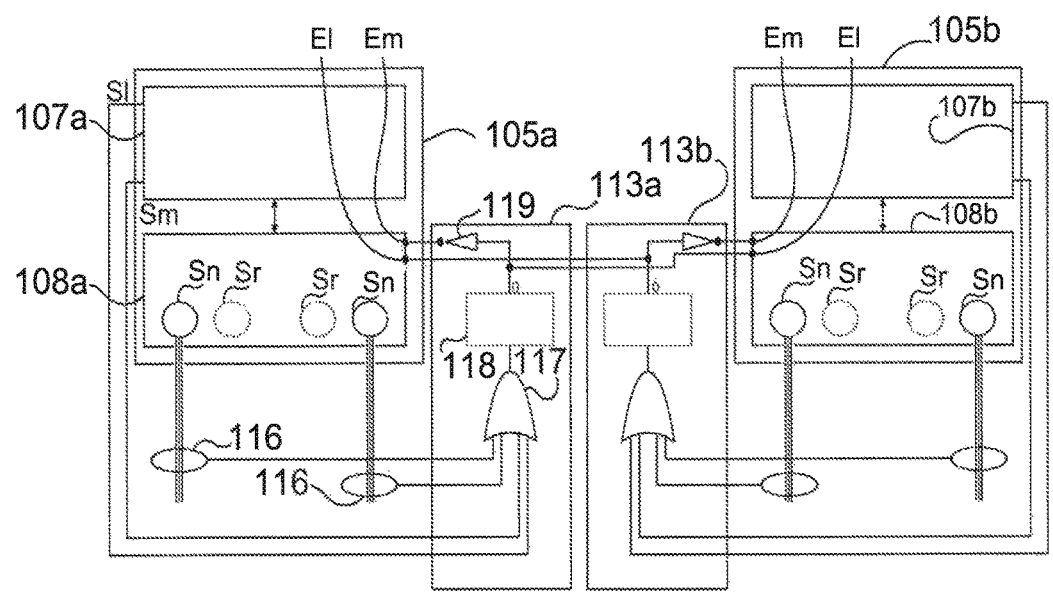
FIG. 5 shows the monitoring means of the aircraft braking system in the first embodiment of the invention.

With reference to FIG. 5, the first monitoring module 113a has one input connected to a software output S1 of the first braking control module 107a, via which the first monitoring module 113a receives a software monitoring signal from the first braking control module 107a and one input connected to a hardware output Sm of the first braking control module 107a via which the first monitoring module 113a receives a hardware monitoring signal from the first braking control module 107a. The first monitoring module 113a also has two inputs connected to sensors 116 monitoring the two nominal outputs Sn of the first motor control module 108a, via which the first monitoring module 113a receives monitoring signals from the outputs enabling it to detect abnormal behavior of the nominal output Sn of the first motor control module 108a.

The software monitoring signal makes it possible to detect an absence of braking in response to a braking setpoint transmitted to the first braking control module 107a. The hardware monitoring signal makes it possible to detect a lack of activity of the first braking control module 107a by using mechanisms of the electronic watchdog circuit type. The sensors 116 detect the control command being in the high logic state for a prolonged duration, which command controls the power transistors of the inverters 106. Specifically, in order to guarantee proper operation of the motors 103 of the electromechanical actuators 101, dead times are introduced by the first motor control module 108a in order to compensate for the switching times of the power transistors. Thus, by design, a control command present on a nominal output Sn of the first motor control module 108a (e.g. a control command of type Ki) cannot remain in the high state for longer than a certain length of time.

The second monitoring module 113b monitors the second control module 105b in the same manner.

Each of the first and second monitoring modules 113a and 113b includes an OR gate 117, a synchronous bistable 118, and a NOT gate 119.

The OR gate 117 of the first monitoring module 113a implements an OR logic function on the inputs of the first monitoring module 113a. The output from the OR gate 117 is applied as input to the synchronous bistable 118 of the first monitoring module 113a. The output from the synchronous bistable 118 of the first monitoring module 113a is connected to a discrete software input El of the second motor control module 108b. The output of the synchronous bistable 118 of the first monitoring module 113a is also applied as input to the NOT gate 119 of the first monitoring module 113a. The output from the NOT gate 119 of the first monitoring module 113a is connected to a discrete hardware input Em of the first motor control module 108a.

Likewise, the OR gate 117 of the second monitoring module 113b performs a logic OR function on the inputs of the second monitoring module 113b. The output from the OR gate 117 is applied as input to the synchronous bistable 118 of the second monitoring module 113b. The output from the synchronous bistable 118 of the second monitoring module 113b is connected to a discrete software input of the first motor control module 108a. The output from the synchronous bistable 118 of the second monitoring module 113b is also applied as input to the NOT gate 119 of the second monitoring module 113b. The output from the NOT gate 119 of the second monitoring module 113b is connected to a discrete hardware input Em of the second motor control module 108b.

It should be observed that advantageously the inputs of the first and second monitoring modules 113a and 113b can be locked by a locking device comprising a bistable mechanism that is reinitialized on each start in order to avoid untimely switching. It would also be possible to use such a locking device to lock the outputs of the first monitoring module 113a and of the second monitoring module 113b, or indeed the inputs or the outputs of the synchronous bistable 118 of the first monitoring module 113a and of the second monitoring module 113b. The locking device may also be adapted to prevent simultaneously triggering the first monitoring module 113a and the second monitoring module 113b.

Finally, the braking computer 102 has a power supply module 120 (visible in FIG. 3) that is connected to a first direct current (DC) power supply Pa and to a second DC power supply Pb that is independent from the first DC power supply Pa. The power supply module 120 includes protection means 121 for protecting the braking computer 102 from various disturbances coming in particular from the first DC power supply Pa and from the second DC power supply Pb. The power supply module 120 supplies DC power to the inverters 106, whereby each inverter 106, under the control of a control command, controls the motor 103 of an electromechanical actuator 101.

The operation of the braking system in the first embodiment is described below in detail.

The braking system is adapted to operate in a nominal mode of operation and in a reconfigured mode of operation.

The nominal mode of operation, shown in FIG. 3, corresponds to a situation in which the first control module 105a and the second control module 105b are operating normally.

The first monitoring module 113a and the second monitoring module 113b do not detect any failure. The outputs from the OR gates 117 of the first and second monitoring modules 113a and 113b are in the low state (equal to "0"), and thus the discrete software inputs El of the first and second motor control modules 108a and 108b are in a low state, and the discrete hardware inputs Em of the first and second motor control modules 108a and 108b are in a high state (equal to "1", because of the NOT gate 119).

Because of the low state of its discrete software input El and the high state of its discrete hardware input Em, each motor control module 108 is in a nominal mode of operation.

The first and second motor control modules 108a and 108b each execute respective fast motor servo-control loops for controlling half of the motors.

The first motor control module 108a thus transmits a control command to the electromechanical actuators 101 of the first group Ga via its two nominal outputs Sn. The two reconfigured outputs Sr of the first motor control module 108a are inactive.

Each first OR unit 112a thus receives a control command on its nominal input En and does not receive any signal on its reconfigured input Er. Each first OR unit 112a thus applies its nominal input En on its output in order to supply the electromechanical actuators 101 of the first group Ga.

Likewise, the second motor control module 108b transmits a control command via its two nominal outputs Sn to each of the electromechanical actuators 101 of the second group Gb. The two reconfigured outputs Sr of the second motor control module 108b are inactive.

Each second OR unit 112b thus receives a control command on its nominal input En and does not receive any signal on its reconfigured input Er. Each second OR unit 112b thus applies its nominal input En on its output in order to supply the control command to one of the electromechanical actuators 101 of the second group Gb.

It should be observed that when one of the first and second motor control modules 108a and 108b and thus one of the first and second control modules 105a and 105b is in the nominal mode of operation, the other of the first and second motor control modules 108a and 108b, and thus the other of the first and second control modules 105a and 105b, is likewise necessarily in the nominal mode of operation.

Figure 6:
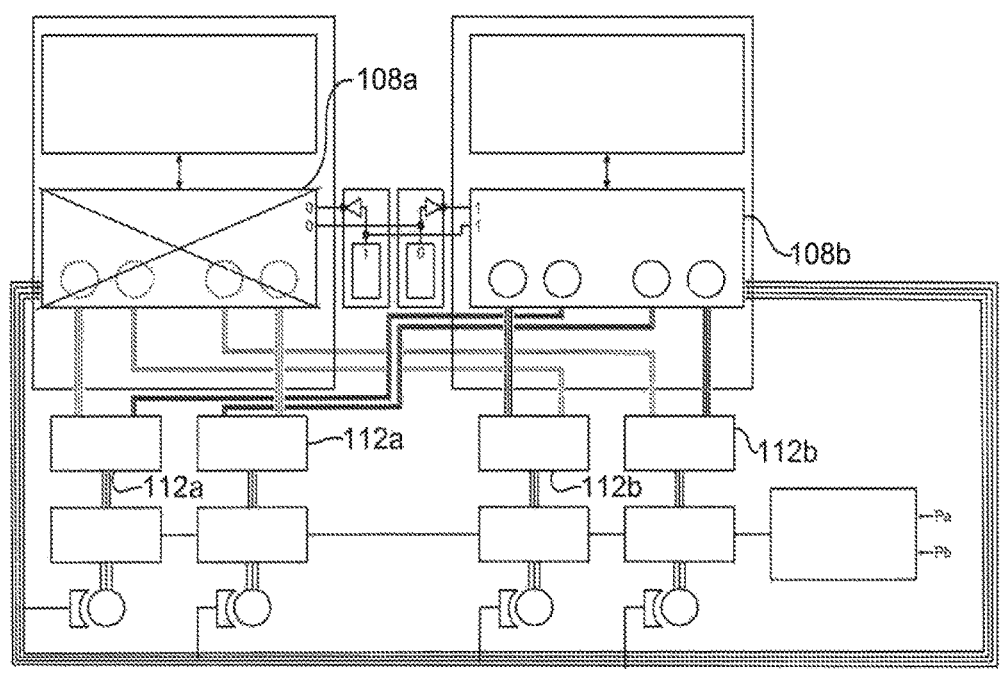
FIG. 6 shows an aircraft braking system in the first embodiment of the invention, the braking system being configured to operate in a reconfigured mode.

The reconfigured mode of operation, shown in FIG. 6, corresponds to a situation in which a failure has occurred in one of the control modules 105.

Specifically, in this example, a failure has occurred in the first motor control module 108a of the first control module 105a.

One of the signals from the signals produced by the sensors 116 (depending on the origin of the failure) is thus in a high state. The output from the OR gate 117 of the first monitoring module 113a thus switches to a high state.

The discrete software input El of the second motor control module 108b then switches to a high state, and the discrete hardware input Em of the first motor control module 108a switches to a low state.

Because of the low state of its discrete hardware input Em, the first motor control module 108a is inhibited (a microprocessor of the first motor control module 108a is off). The nominal outputs Sn and the reconfigured outputs Sr of the first motor control module 108a are inactive and put into a low state.

Because of the high state of its discrete hardware input Em and the high state of its discrete software input El the second motor control module 108b switches into a reconfigured mode.

The second motor control module 108b executes a fast motor servo-control loop for controlling all of the motors.

The second motor control module 108b thus acts via its two nominal outputs Sn to transmit a control command to the electromechanical actuators 101 of the second group Gb and via its two reconfigured outputs Sr to transmit a control command to the electromechanical actuators 101 of the first group Ga.

The two nominal outputs Sn and the two reconfigured outputs Sr of the second motor control module 108b are thus active.

Each second OR unit 112b thus receives a control command on its nominal input En, and a zero signal on its reconfigured input Er. Each second OR unit 112b thus applies its nominal input En on its output in order to supply the control command to one of the electromechanical actuators 101 of the second group Gb.

Each first OR unit 112a thus receives a control command on its reconfigured input Er, and a zero signal on its nominal input En. Each first OR unit 112a thus applies its reconfigured input Er on its output in order to supply the control command to one of the electromechanical actuators 101 of the first group Ga.

Thus, in spite of the failure affecting the first control module 105a, the four electromechanical actuators are controlled and braking is provided at 100% by the second control module 105b.

With reference to FIG. 7, it should be observed that each braking control module 108 thus operates in three distinct modes depending on the states of its discrete hardware inputs and of its discrete software inputs: a deactivation mode, a nominal mode, and a reconfigured mode.

Naturally, when a failure occurs on the second control module 105b, the operation of the braking system is similar to the above description, and full braking is provided by the first control module 105a.

It should be observed that when one of the first and second motor control modules 108a and 108b, and thus when one of the first and second control modules 105a and 105b is in the reconfigured mode of operation, the other one of the first and second motor control modules 108a and 108b, and thus the other one of the first and second control modules 105a and 105b is necessarily inhibited. The braking system of the invention thus presents an architecture that is dissimilar, in which, in the event of a simple failure and/or a common mode failure, the braking performance is maintained at its highest level. It should also be observed that using the first DC power supply Pa and the second DC power supply Pb that is independent from the first DC power supply Pa enables the braking system to operate normally in spite of a failure of a power supply.

Figure 8:
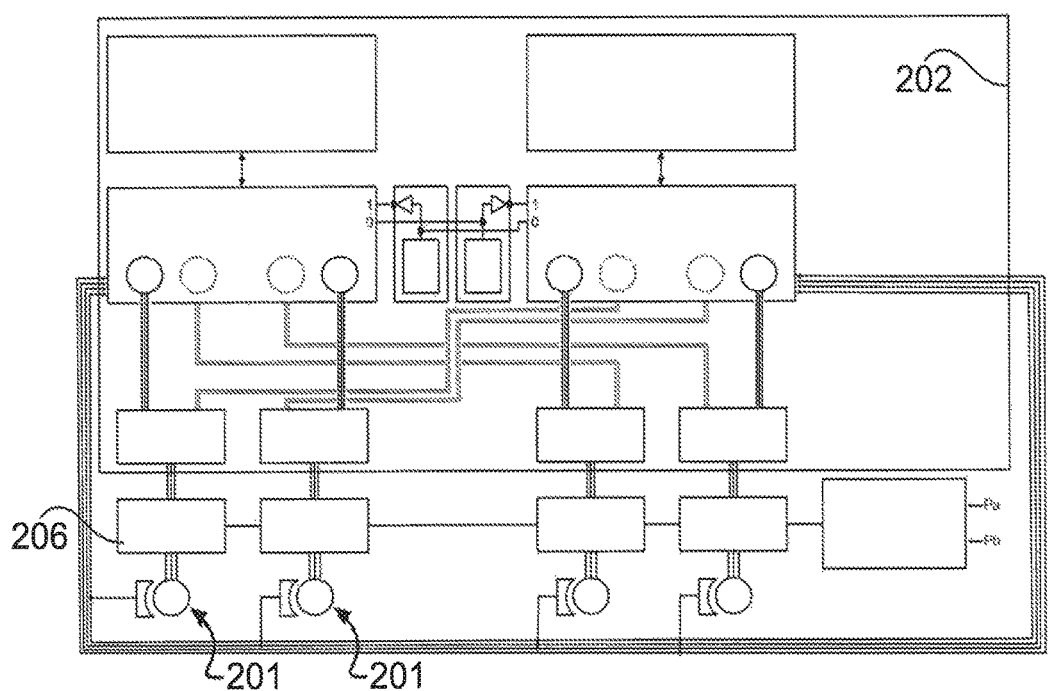
FIG. 8 shows an aircraft braking system in a second embodiment of the invention.

In a second embodiment, described with reference to FIG. 8, the inverters 206 are no longer situated in the braking computer 202. Each inverter 206 is remote and situated in the proximity of an electromechanical actuator 201. Specifically, each inverter 206 is directly incorporated in an electromechanical actuator 201. The architecture is thus an architecture that is distributed. It should be observed that the notion of an architecture that is distributed can be generalized to other degrees of distribution.

Naturally, the present invention is not limited to the embodiments described but covers any variant coming within the field of the invention, as defined by the claims.

Although it is stated that the first and second control modules are incorporated in the same braking computer, it is possible for them to be incorporated in two distinct braking computers.

The OR function performed in each monitoring module could be a function of recombining different inputs (e.g. a function combining both a logic OR and a logic AND).

Although the presently-described braking system presents an architecture that is dissimilar, the invention naturally applies to a braking system presenting an architecture that is not dissimilar.

Likewise, although it is stated herein that each of the first and second groups Ga and Gb has one electromechanical actuator used for braking one wheel and another electromechanical actuator used for braking another wheel, the invention naturally applies to groups of actuators, each of which is used for braking only a single wheel.

The invention claimed is:

1. An aircraft braking system comprising:
a first group (Ga) of electromechanical actuators (101) and a second group (Gb) of electromechanical actuators (101) arranged to apply a braking force to wheels of an aircraft;
a first computerized control module (105a) adapted to be configured in a nominal mode of operation or in a reconfigured mode of operation, and a second computerized control module (105b) adapted to be configured in a nominal mode of operation or in a reconfigured mode of operation, the first computerized control module (105a) being adapted, in the nominal mode of operation, to control the first group of electromechanical actuators, and in the reconfigured mode of operation, to control the first group of electromechanical actuators and the second group of electromechanical actuators, and the second computerized control module (105b) being adapted, in a nominal mode of operation, to control the second group of electromechanical actuators, and in the reconfigured mode of operation, to control the first group of electromechanical actuators and the second group of electromechanical actuators; and
a computerized monitoring unit, which is not directly connected to and does not control the first or second groups of electromechanical actuators, adapted and dedicated to monitor the operation of the first computerized control module and of the second computerized control module, and to configure the first computerized control module into the reconfigured mode of operation when the computerized monitoring unit detects a failure of the second computerized control module by modifying a signal applied on an input of the first computerized control module, and to configure the second computerized control module into the reconfigured mode of operation when the computerized monitoring unit detects a failure of the first computerized control module by modifying a signal applied on an input of the second computerized control module.

2. The braking system according to claim 1, wherein, when one of the first and second computerized control modules (105a, 105b) is in the reconfigured mode of operation, the other one of the first and second computerized control modules (105a, 105b) is necessarily inhibited, and wherein, when one of the first and second computerized control modules (105a, 105b) is in the nominal mode of operation, the other one of the first and second computerized control modules (105a, 105b) is likewise necessarily in the nominal mode of operation.

3. The braking system according to claim 1, wherein the computerized monitoring unit includes a first computerized monitoring module (113a) arranged to monitor the operation of the first computerized control module (105a) and a second computerized monitoring module (113b) arranged to monitor the operation of the second computerized control module (105b), the first computerized monitoring module (113a) being adapted, on detecting a failure of the first computerized control module, to cause the second computerized control module to switch into the reconfigured mode, and the second computerized monitoring module (113b) being adapted, on detecting a failure of the second computerized control module, to cause the first computerized control module to switch into the reconfigured mode.

4. The braking system according to claim 3, wherein each of the first and second computerized monitoring modules (113a, 113b) has a discrete output connected both to a discrete input of the first computerized control module (105a) and to a discrete input of the second computerized control module (105b), the discrete outputs and inputs being used to cause the first and second computerized control modules (105a, 105b) to switch into the nominal mode of operation and into the reconfigured mode of operation.

5. The braking system according to claim 4, wherein each computerized monitoring module of the first and second computerized monitoring modules possesses a plurality of inputs receiving monitoring signals and performs a recombination function on the plurality of inputs, the result of the recombination function being applied to the output of each said first and second monitoring module.

6. The braking system according to claim 5, wherein the monitoring signals comprise a software monitoring signal serving to detect an absence of braking in response to a braking setpoint and/or a hardware monitoring signal serving to detect a lack of activity and/or a signal monitoring an output from one of the first and second computerized control modules.

7. The braking system according to claim 1, wherein each computerized control module possesses a nominal output used in the nominal mode of operation and in the reconfigured mode of operation, and a reconfigured output used solely in the reconfigured mode of operation, the nominal output of one of the first and second computerized control modules and the reconfigured output of the other of the first and second computerized control modules being connected to electromechanical actuators of the first group of electromechanical actuators or of the second group of electromechanical actuators via an OR unit (112) that performs a logic OR function on inputs of the OR unit (112) and that applies the result of the OR function to an output of the OR unit (112).

8. The braking system according to claim 1, wherein each electromechanical actuator (101) is controlled via an inverter (106) incorporated in a braking computer (102) in which the first and second computerized control modules (105*a*, 105*b*) are positioned.

9. The braking system according to claim 1, wherein each electromechanical actuator (101) is controlled via an inverter (106) incorporated in the electromechanical actuator (101).

* * * * *